(12) United States Patent
Siebecker et al.

(10) Patent No.: US 8,566,271 B2
(45) Date of Patent: Oct. 22, 2013

(54) SYSTEM AND METHOD FOR AGGREGATING INFORMATION

(75) Inventors: David B. Siebecker, Lowell, MA (US); Barbara J. Blyth, Ellington, CT (US)

(73) Assignee: Raytheon Company, Waltham, MA (US)

( * ) Notice: Subject to any disclaimer, the term of this patent is extended or adjusted under 35 U.S.C. 154(b) by 703 days.

(21) Appl. No.: 12/713,331

(22) Filed: Feb. 26, 2010

(65) Prior Publication Data
US 2011/0213747 A1    Sep. 1, 2011

(51) Int. Cl.
*G06F 9/44* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 6,125,339 A | 9/2000 | Reiser et al. | |
| 6,304,833 B1 | 10/2001 | Ferkinhoff et al. | |
| 6,944,566 B2 | 9/2005 | Chen et al. | |
| 2003/0191610 A1 | 10/2003 | Chen et al. | |
| 2004/0019575 A1 | 1/2004 | Talbot et al. | |

OTHER PUBLICATIONS

Challa et al., "Baysian and Dempster-Shafer fusion," Sadhana, vol. 29, Par 2, Apr. 2004, pp. 145-176.*
Shenoy, "Binary Join Trees for Computing Marginals in the Shenoy-Shafer Architecture," Ku School of Business Working Paper No. 270, Dec. 1995, International Journal of Approximate Reasoning, 17 (2-3), 1997, pp. 239-263 (27 pages.).*
Valin et al., "Information Fusion Concepts for Airborne Maritime Surveillance and C2 Operations", Defence R&D Canada, May 2006, pp. 1-96.*
Gordon et al., "A Method for Managing Evidential Reasoning in a Hierarchical Hypothesis Space," Report No. STAN-CS-84-1023, *Stanford University School of Medicine*, Sep. 21, 1984, 35 pages.
Shenoy et al., "Propagating Belief Functions with Local Computations," *IEEE Expert*, 1986, 9 pages.
Shafer et al., "Propagating Belief Functions in Qualitative Markov Trees," *International Journal of Approximate Reasoning*, 1987, pp. 349-400.
Shenoy et al., "Axioms for Probability and Belief-Function Propagation," *Uncertainty in Artificial Intelligence 4*, 1990, pp. 169-198.
Liu et al., "A Method of Learning Implication Networks from empirical Data: Algorithm and Monte-Carlo Simulation Based Validation," *Dept. of Computing Studies, Baptist University, Centre de recherché informatique de Montréal*, 1997, 32 pages.
Schmidt et al., "Some improvements to the Shenoy-Safer and Hugin architectures for computing marginals," *Artificial Intelligence*, 1998, pp. 332-333.

(Continued)

*Primary Examiner* — Jeffrey A Gaffin
*Assistant Examiner* — Paulinho E Smith
(74) *Attorney, Agent, or Firm* — Pierce Atwood LLP; Joseph M. Maraia

(57) ABSTRACT

A method for allocating resources includes receiving one or more parameters associated with an object of interest. At least one of the parameters corresponds to a probability that the object of interest is participating in a predetermined situation of interest. The method also includes calculating a plurality of values, based at least in part on the parameters, and selecting, based at least in part on the calculated values, one or more operations to be performed involving the object of interest. In addition the method includes generating an instruction based at least in part on the operation to be performed transmitting the instruction to an operational resource.

18 Claims, 5 Drawing Sheets

| VARIABLES | VARIABLE OFFSET | STATES | STATE IDENTIFIERS |
|---|---|---|---|
| ENGINE TYPE | 1 | JET | 0 |
| | | PROPELLER | 1 |
| AIRCRAFT LENGTH | 2 | SHORT | 0 |
| | | MEDIUM | 1 |
| | | LONG | 2 |
| NUMBER OF ENGINES | 6 | 1 | 0 |
| | | 2 | 1 |
| | | 3 | 2 |
| | | 4 | 3 |
| | | 5 | 4 |
| | | 6 | 5 |
| | | 7 | 6 |
| | | 8 | 7 |

200

(56) References Cited

OTHER PUBLICATIONS

Lukaszewski, "Updating the evidence in the Dempster-Shafer theory," *Institute of Computing Science*, Dec. 19, 1998, 19 pages.

Lehman et al., "An Alternative to Outward Propagation for Dempster-Shafer Belief Functions," *Institute of Informatics, University of Fribourg*, 1999, 12 pages.

Jouan et al., "Airborne Fusion of Imaging and Non-Imaging Sensor Information for Maritime Surveillance," *Lockheed Martin Canada, Research and Development Dept., Centre de Recherches Mathématiques, Université de Montréal, C.P., Defense Research Establishment Valcartier*, 1999, 6 pages.

Wilson, "Algorithms for Dempster-Shafer Theory," *School of Computing and Mathematical Sciences*, 1999, 58 pages.

Wu, "Sensor Fusion Using Dempster-Shafer Theory," *IEEE Instrumentation and Measurement Technology Conference*, May 2002, 6 pages.

Yu et al., "Uncertain Information Fusion for Force Aggregation and Classification in Airborne Sensor Networks," *School of Computer Science, Carnegie Melton University, American Association for Artificial Intelligence* 2004, 8 pages.

Challa et al., "Baysian and Dempster-Shafer fusion," *Sädhnä*, vol. 29, Par 2, Apr. 2004, pp. 145-176.

Koks et al., "An Introduction to Bayesian and Dempster-Shafer Data Fusion," DSTO-TR-1436, *Australian Government, Department of Defence*, 50 pages.

\* cited by examiner

SYSTEM AND METHOD FOR AGGREGATING INFORMATION

TECHNICAL FIELD OF THE INVENTION

This invention relates generally to information-fusion systems and more particularly to a method and system for efficient decision-making using belief networks.

BACKGROUND OF THE INVENTION

Information fusion is a process for associating, correlating, and combining data and information from one or more sources to achieve refined estimates of parameters, characteristics, events, and behaviors for observed entities. Accordingly, information fusion techniques combine data from multiple sources to achieve improved accuracies and more specific inferences regarding the observed entities. Thus, information fusion can provide improved decision-making in rapidly-changing environments in which imperfect data is provided by multiple sources.

SUMMARY OF THE INVENTION

The present invention provides a method and system for processing information received from one or more sources to determine the probability of a particular state existing or a particular event occurring. Particular embodiments substantially reduce or eliminate at least some of the disadvantages and problems associated with previous methods and systems for processing such information.

In accordance with one embodiment of the present invention, a method for processing information includes receiving information defining a first valuation, wherein the first valuation indicates a level of support for each of a first set of configurations and generating a configuration identifier for each of the first set of configurations. The method further includes storing the configuration identifiers for the first set of configurations in a first ordered list. Additionally, the method includes receiving information defining a second valuation, wherein the second valuation indicates a level of support for each of a second set of configurations and generating a configuration identifier for each of the second set of configurations. The method also includes storing the configuration identifiers for the second set of configurations in a second ordered list and comparing the first ordered list to the second ordered list. The method further includes identifying, based on the comparison of the first ordered list and the second ordered list, a third set of configurations that are include in both the first set of configurations and the second configurations. Moreover, the method also includes generating a third valuation based on the third set of configurations, wherein the third valuation indicates a level of support for each of the third set of configurations and storing at least a portion of the third valuation in an electronic memory.

Important technical advantages of certain embodiments of the present invention include efficient processing of data to identify or detect states or events related to objects of interest. By utilizing certain techniques for combining data from multiple sources, particular embodiments of the present invention can make determinations regarding objects of interest more rapidly than conventional fusion techniques. Additionally, particular embodiments may provide more efficient use of processing and/or memory resources in making such determinations. Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
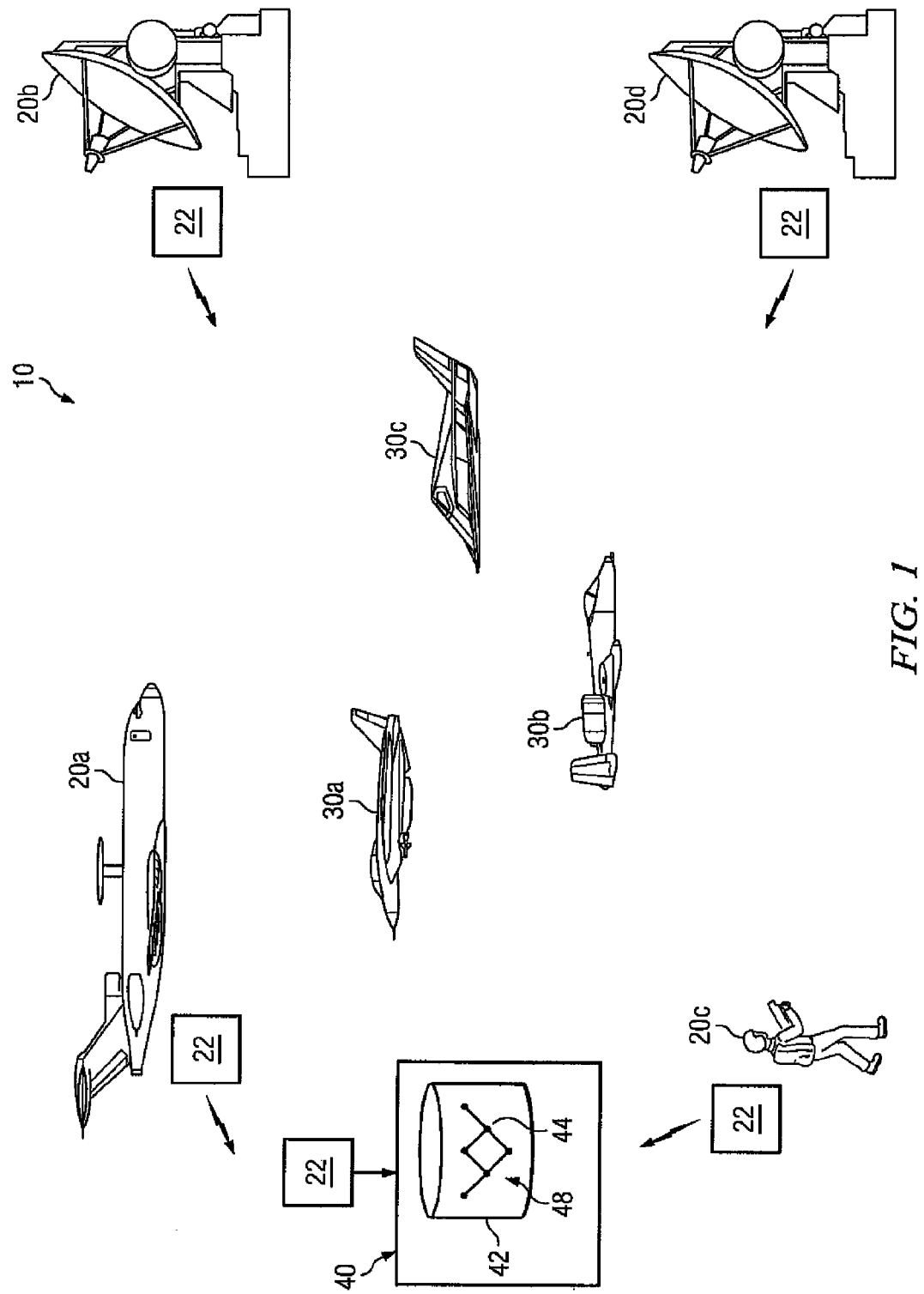
FIG. 1 illustrates a particular embodiment of an intelligence-gathering system that includes an information aggregator and a plurality of sensors.

FIG. 1 illustrates a particular embodiment of an intelligence-gathering system 10 for collecting information on objects of interest 30 and making determinations regarding objects of interest 30 based on the collected information. System 10 includes one or more sensors 20, one or more objects of interest 30, and an information aggregator 40. Sensors 20 generate evidence 22 relating to objects of interest 30 and transmit evidence 22 to information aggregator 40, which aggregates evidence 22 and makes decisions regarding objects of interest 30 based on the aggregated evidence 22.

In particular embodiments, information aggregator 40 utilizes evidential-reasoning techniques, such as Dempster-Shafer evidential reasoning, to aggregate evidence 22 and make determinations based on the aggregated evidence 22. Because the aggregation of significant amounts of information from multiple sources in an evidential-reasoning network can be time- and resource-intensive, system 10 may utilize certain techniques to sort and store information regarding objects of interest 30 to efficiently combine new evidence 22 generated by sensors 20 with existing evidence stored by information aggregator 40. Although the described techniques may be applied to any suitable information-fusion system, the description below focuses, for purposes of illustration, on an example embodiment in which information from multiple sensors 20 are combined to determine the nationality of targets in a combat identification system using Dempster-Shafer evidential reasoning.

Sensors 20a-c (each of which may be referred to generically as a "sensor 20") observe objects of interest 30, generate evidence 22 associated with objects of interest 30, and transmit evidence 22 to information aggregator 40. Sensors 20 may each represent any type of device or group of devices suitable to observe, detect, or monitor objects of interest 30 and generate evidence 22 pertaining to these objects of interest 30. Examples of sensors 20 include, but are not limited to, video and still cameras, motion detectors, radar antennas, sonar receivers, infrared detectors, seismometers, thermal-imagining systems, and x-ray imaging systems. More generally, however, sensors 20 may represent any appropriate combination of hardware, software, and/or encoded logic suitable to provide the described functionality. Sensors 20 may couple to information aggregator 40 through a dedicated connection (wired or wireless) or may connect to information aggregator 40 only as necessary to transmit evidence 22. Although FIG. 1 illustrates for purposes of example a particular number and type of sensors 20, alternative embodiments of system 10 may include any appropriate number and type of sensors 20.

Evidence 22 comprises data generated by sensors 20 and transmitted to information aggregator 40. Evidence 22 may represent any appropriate type of data defining, describing, specifying, or otherwise indicating one or more characteristics, conditions, or occurrences associated with a particular object of interest 30. In particular embodiments, system 10 monitors a set of propositions relating to objects of interest 30. These propositions are modeled within system 10 by a set of variables, and each variable is associated with a particular set of possible values, or "states." In such embodiments, evidence 22 provides information regarding the state of one or more of these variables. For example, in particular embodiments, objects of interest 30 may each represent an aircraft and evidence 22 may indicate the aircraft type of the relevant aircraft (e.g., MIG, F-16), the number or type (e.g., jet, propeller) of engines the relevant aircraft carries, and/or other appropriate characteristics of the aircraft. Furthermore, in particular embodiments, system 10 utilizes evidential reasoning and evidence 22 may indicate a level of belief associated with one or more states of a particular variable instead of providing a definitive determination of the relevant variable's state. Evidence 22 may represent a text file, a relational database file, a data stream, or information structured in any other suitable manner. In particular embodiments, sensors 20 transmits evidence 22 to information aggregator 40 as Extensible Markup Language ("XML") data.

Objects of interest 30 represent vehicles, structures, people, creatures, or other objects monitored or detected by sensors 20. In particular embodiments, objects of interest 30 may represent intangible elements, such as financial instruments, natural phenomena, and computer processes. Objects of interest 30 may be associated with certain properties, states, or outcomes that sensors 20 detect, and intelligence-gathering system 10 may be configured to make determinations regarding objects of interest 30 based on data generated by sensors 20 regarding these properties, states, or outcomes. In the illustrated embodiment, objects of interest 30 represent aircraft operating in a combat area.

Information aggregator 40 receives evidence 22 from sensors 20 and combines evidence 22 with information previously stored by information aggregator 40. Based on the aggregated information, information aggregator 40 makes determinations relating to objects of interest 30. Information aggregator 40 may represent any appropriate combination of hardware and/or software suitable to provide the described functionality. For example, in particular embodiments, information aggregator 40 represents a personal computer (PC) connected to sensors 20 by a computer network and capable of receiving data from sensors 20 over the network. The contents and operation of a particular embodiment of information aggregator 40 are discussed in further detail below with respect to FIGS. 2-5.

In operation, sensors 20 each monitor one or more objects of interest 30 and generate evidence 22 relating to the monitored objects of interest 30. Each item of evidence 22 generated by a sensor 20 provides information indicating, or supporting a belief, that a particular subset of variables has a particular subset of states. For example, in the illustrated embodiment, objects of interest 30 represent aircraft operating in a combat area, and sensors 20 generate evidence 22 relating to propositions that may be used to determine the nationality of the monitored objects of interest 30, such as the size of objects of interest 30, the number of engines that objects of interest 30 have, and the engine types of these engines.

Each sensor 20 may generate information relating to one or more of the various propositions, and different sensors 20 may generate information relating to different combinations of these propositions. For example, a first sensor 20 (e.g., sensor 20a) may generate evidence 22 indicating that a particular object of interest 30 (e.g., object of interest 30a) has a "medium" length and one engine, while a second sensor 20 (e.g., sensor 20b) may generate evidence 22 supporting the same collection of propositions or a different collection of propositions. Thus, sensor 20b may generate evidence 22 indicating a belief that object of interest 30a has a "jet" engine type, but indicating nothing about the length of object of interest 30a or the number of engines it has. Additionally, a particular sensor 20 may provide evidence 22 supporting multiple different states for the same variable. For example, a particular sensor 20 may generate evidence indicating that object of interest 30a has more than 2 engines or, in other words, that object of interest 30a has 4 or 8 engines. Thus, each element of evidence 22 generated by sensors 20 provides support for a particular set, or "configuration," of one or more states associated with one or more variables.

Sensors 20 transmit generated evidence 22 to information aggregator 40. Sensors 20 transmit generated evidence 22 to information aggregator 40 over dedicated connections between sensors 20 and information aggregator 40, over a communications network coupling sensors 20 and information aggregator 40, and/or using any other appropriate components. Sensors 20 may transmit evidence 22 to information aggregator 40 as soon as evidence 22 is created, store evidence 22 for periodic transmissions before transmitting, or transmit evidence 22 to information aggregator 40 at any appropriate time and according to any appropriate schedule. In particular embodiments, sensors 20 monitor objects of interest 30 on a continual basis and transmit evidence 22 to information aggregator 40 every several seconds.

Information aggregator 40 maintains a database 42 in which information aggregator 40 stores information pertaining to one or more objects of interest, and information aggregator 40 updates database 42 based on received evidence 22. In particular embodiments, information aggregator 40 stores, in database 42, information indicating a degree of belief that particular variables relating to a monitored object of interest 30 have particular states. More specifically, information aggregator 40 stores information indicating that a particular configuration accurately reflects the state of a particular subset of variables, or "frame," associated with that configuration. This degree of belief may be represented by a basic probability assignment ("BPA"), belief mass, belief value, disbelief value, plausibility value, confidence level, trust level, and/or other any other appropriate measure of belief, trust, or confidence (all of which are referred to generically herein as a "valuation").

As noted above, evidence 22 provides support for a particular configuration, and information aggregator 40 generates a valuation to associate with that particular configuration, based on received evidence 22, in any appropriate manner. As one example, in particular embodiments, sensors 20 may provide confidence levels as part of evidence 22 that reflect confidence the relevant sensors 20 have in measurements captured by the generated evidence 22. In such embodiments, sensors 20 may determine confidence level based on the environmental conditions under which the measurements were taken, the type of measurements being made, or other suitable factors. As another example, information aggregator 40 may store reliability scores for sensors 20 indicating the reliability of evidence 22 provided by sensors 20 and may generate valuations based on these reliability scores. More generally, however, information aggregator 40 can generate the valuations in any suitable manner based on received evidence 22 and/or other available information.

As information aggregator 40 receives evidence, information aggregator 40 processes newly-received evidence 22 to allow information aggregator 40 to combine the new evidence 22 with previously-received evidence 22. This may involve applying weightings to received evidence 22 (e.g., based on confidence levels associated with the received evidence 22), quality-checking received evidence 22, extracting data from received evidence 22, and/or otherwise processing received evidence 22 to facilitate entry of corresponding valuations into database 42. Information aggregator 40 then aggregates newly-received evidence 22 with existing evidence 22 and a priori information regarding objects of interest 30 in database 42. In particular embodiments, information aggregator 40 utilizes evidential reasoning techniques to aggregate evidence 22 and then make determinations based on the aggregated evidence 22.

For example, in the illustrated embodiment, information aggregator 40 implements Dempster-Shafer information-fusion algorithms to aggregate evidence 22 and draw inferences from aggregated evidence 22. As part of implementing these algorithms, information aggregator 40 may maintain a belief network that indicates relationships between valuations and other data associated with the variables monitored by system 10. In the illustrated embodiment, information aggregator 40 models this belief network with a join tree 44 stored as a series of data objects. Each of these data objects represents a node 46 in join tree 44 and includes pointers to objects modeling neighboring nodes 46 in join tree 44. Join tree 44 may be generated in a similar manner to that described in "Binary Join Trees for Computing Marginals in the Shenoy-Shafer Architecture," *International Journal of Approximate Reasoning*, 17(2-3), 1997, 239-263, which is incorporated herein by reference.

In this example, information aggregator 40 updates join tree 44 based on newly-received evidence 22 by combining evidence 22 with existing information in join tree 22. For example, if evidence 22 indicates a particular BPA ($BPA_1$) for a first frame (A), information aggregator 40 may add this evidence 22 to join tree 44 by combining $BPA_1$ with the information stored in an existing node 46 of join tree 44. Assuming the existing node 46 of join tree 44 stores a BPA ($BPA_2$) for a second frame (B), the new evidence 22 can be combined with the information stored in the existing node 46 to form a combined BPA ($BPA_{12}$) over a new frame (C) in accordance with Dempster's Rule of Combination. Based on Dempster's Rule of Combination, the combined BPA can be calculated as:

$$BPA_{12}(C) = \frac{\sum_{A \cap B = C} BPA_1(A)BPA_2(B)}{1 - \sum_{A \cap B - \emptyset} BPA_1(A)BPA_2(B)}$$

As the above equation suggests, combining new evidence 22 with existing information in join tree 44 involves determining the intersection of several different elements of the combined frames. Each element of the combined frames (i.e., A and B) may provide information regarding a large number of different propositions. As a result, these intersection operations can be time consuming and can waste processing and memory resources. Furthermore, certain techniques for performing this combination may involve expanding the combined variable frames to create a common variable frame and then contracting this new frame after completing the intersections across this larger frame. This extension and contraction process can likewise be time consuming and inefficient.

Thus, in particular embodiments of system 10, information aggregator 40 facilitates the combination process by assigning a unique identifier to each configuration for which information aggregator 40 stores information. Information aggregator 40 may then use these identifiers to sort the configurations supported by a particular element of evidence 22 or by a particular node 46 of join tree 44. Once the identifiers for all configurations have been sorted for both the received evidence 22 and the existing node 46 of join tree 44, information aggregator 40 can more easily identify the configurations common to the valuations of both the received evidence 22 and the existing node 46 of join tree 44. This process is explained in greater detail below with respect to FIGS. 2 and 3.

As evidence 22 is added to database 42, the amount of information supporting the various variable states, and thus, the various propositions monitored by system 10 increase. As the information supporting these propositions increases, information aggregator 40 may determine that sufficient evidence 22 has been collected to make a determination relating to the monitored objects of interest 30. For example, in the illustrated Dempster-Shafer embodiment, information aggregator 40 may determine after inserting one or more sets of evidence 22 that the valuations stored in join tree 44 indicate a level of support for a specific collection of propositions that exceeds a predetermined threshold. Based on this collection of propositions, information aggregator 40 may determine the nationality of specific objects of interest 30. For example, in a particular instance, information aggregator 40 may determine that the support for the propositions associated with a medium length, jet engine type, and four engines exceed predetermined thresholds and select a nationality corresponding to this collection of characteristics.

Information aggregator 40 may then communicate this determination to a user of system 10, store the determination for subsequent use, instruct other components of system 10 to initiate certain actions based on this determination, and/or take any other appropriate steps based on the determination. As one example, information aggregator 40 may incorporate or interface with a monitor, light emitting diodes (LED) display, printer, or other suitable output components and may be capable of displaying the determination, generating reports analyzing the determination, or otherwise communicating information pertaining to the determination to users. As another example, information aggregator 40 may incorporate or interface with some form of electronic memory, such as a local hard drive, a network-attached storage (NAS) system, a storage area network (SAN), or other appropriate types of memory components and may be able to store the determination for subsequent analysis. More generally, however, information aggregator 40 may be configured to take any appropriate action or utilize the determination in any suitable manner.

For example, in the illustrated embodiment, information aggregator 40 couples to a computer monitor that displays the position of nearby objects of interest 30 on a graphical map.

After determining the nationality of a particular object of interest 30, information aggregator 40 may display text indicating the determined nationality on the map next to an icon representing the position of the relevant object of interest 30. A user of system 10 may then be able to use this data to make informed decisions targeting objects of interest and reduce the likelihood of targeting friendly units.

Because sensors 20 may collect data continuously or at very rapid increments, the amount of evidence 22 received and processed by information aggregator 40 can be substantial. Furthermore, in particular embodiments, such as the combat scenario described above, information aggregator 40 may need to make determinations on evidence 22 quickly. By efficiently identifying and ordering the configurations associated with nodes 46 of join tree 44 and/or newly-received evidence 22, particular embodiments of information aggregator 40 may reduce the time and resources utilized to aggregate evidence 22, as described further below with respect to FIGS. 2 and 3. As a result, particular embodiments of system 10 may provide several operational benefits. Specific embodiments, however, may provide some, none, or all of these benefits.

Figure 2:
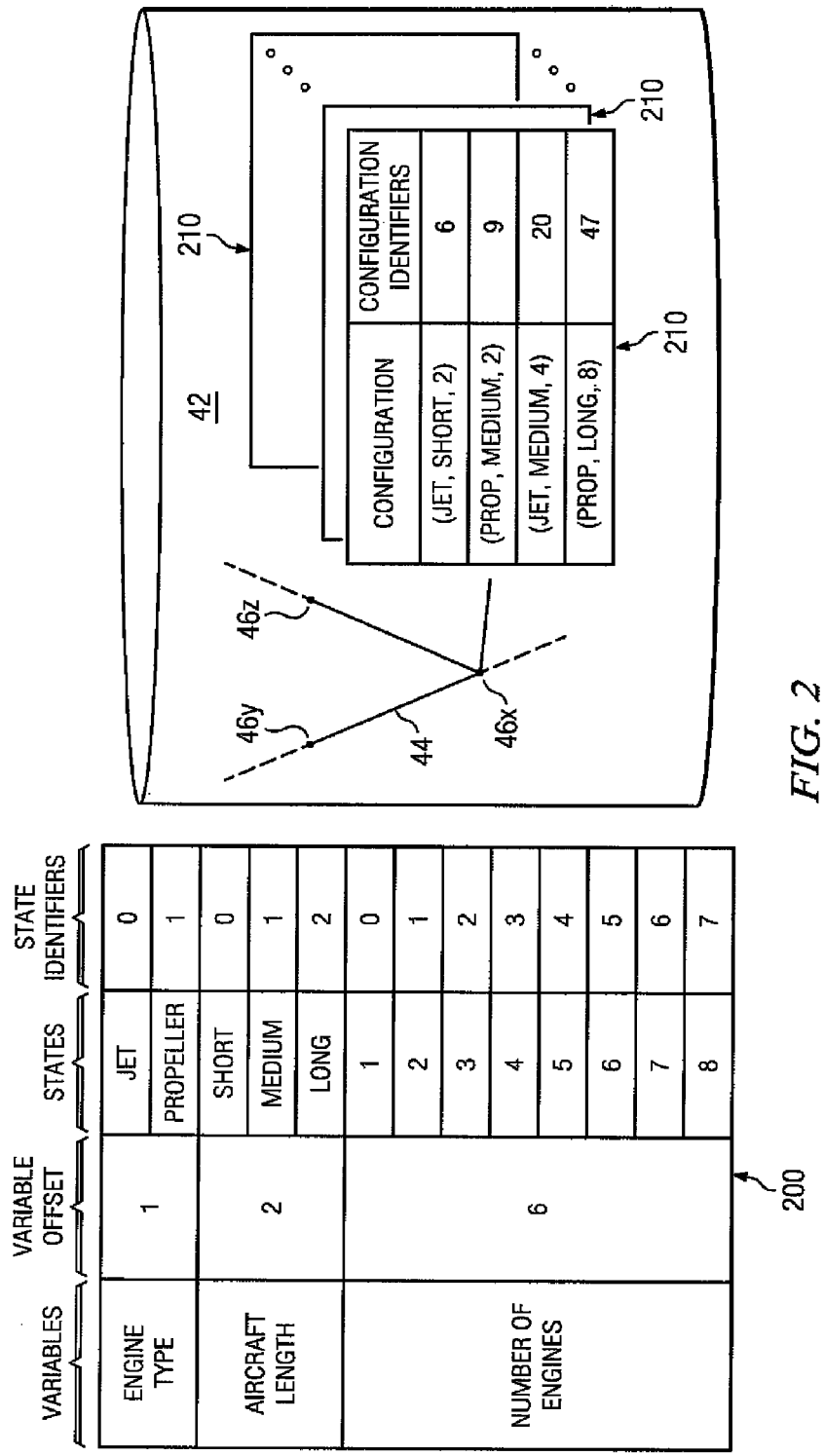
FIG. 2 illustrates an example operation of a particular embodiment of the information aggregator shown in FIG. 1 in generating configuration identifiers for data collected by the intelligence-gathering system.

FIG. 2 illustrates in greater detail the process by which a particular embodiment of information aggregator 40 assigns identifiers to the configurations stored by nodes 46 of join tree 44 and/or evidence 22 received by information aggregator 40. As discussed above, information aggregator 40 (or other appropriate elements of system 10) assigns unique identifiers to configurations to facilitate sorting of the configurations. In particular, FIG. 2 illustrates a portion of binary tree 44 that includes a sample node 46x, as well as a set of identifiers associated with the configurations for which the sample node 46x stores valuations. Although FIG. 2 illustrates a particular example of how identifiers can be assigned to configurations by a particular embodiment of information aggregator 40, alternative embodiments can assign identifiers to configurations in any appropriate manner.

In particular embodiments, information aggregator 40 assigns a numeric offset (referred to herein as a "variable offset") to each variable that information aggregator 40 monitors. (The numeric offsets and other values assigned by information aggregator 40 for the example described by FIG. 2 are shown in table 200.) Information aggregator 40 also assigns to each possible state for each variable an identifier (referred to herein as a "state identifier") that is unique among that variable's states. In particular embodiments, information aggregator 40 utilizes numeric variable offsets and state identifiers and sizes successive variable offsets based on the number of states possible for preceding variables to which information aggregator 40 has already assigned offsets. As a result, information aggregator 40 may generate a unique identifier for the set of states associated with each node 46 of join tree 44 (referred to herein as a "configuration identifier") based on the state identifiers and variable offsets associated with that node 46.

For example, in the example embodiment illustrated by FIG. 2, information aggregator 40 monitors information associated with three variables (i.e., engine type, number of engines, and aircraft length). Additionally, in this example embodiment, it is assumed that objects of interest 30 may have one of three different lengths (short, medium, or long), one of two different engine types (jet or propeller), and any number of engines from one to eight. In this example, information aggregator 40 assigns a variable offset of "1" to the "engine type" variable. Additionally, information aggregator 40 assigns state identifiers of "0" and "1" to the states "jet" and "propeller," respectively.

In this example, information aggregator 40 also assigns a variable offset to the "aircraft length" variable based on the number of possible states for the "engine type" variable. Because there are two possible states for the "engine type" variable in this example (i.e., "jet" and "propeller"), information aggregator 40 assigns, to the "aircraft length" variable, a variable offset equal to two times the "engine type" variable offset, or "2" here. Information aggregator 40 also assigns state identifiers to the three possible states of the "aircraft length" variable. Specifically, information aggregator 40 assigns state identifiers of "0," "1," and "2" to the states "short," "medium," and "long," respectively.

Similarly, information aggregator 40 assigns a variable offset to the "number of engines" variable based on the number of possible states for the "aircraft length" variable. Because there are three states for the "aircraft length" variable (i.e., "short," "medium," and "long"), information aggregator 40 assigns a variable offset to the "number of engines" variable equal to three times the "aircraft length" variable offset, or "6" here. Information aggregator 40 assigns a state identifier to each of the possible states for the "number of engines" variable. Specifically, information aggregator 40 assigns a state identifier of "0," "1," "2," "3," "4," "5," "6," and "7," to the "number of engine" states "1," "2," "3," "4," "5," "6," "7," and "8," respectively.

Using these variable offsets and state identifiers, information aggregator 40 can then generate a unique configuration identifier for each node 46 based on the states for which the relevant node 46 stores information. Information aggregator 40 may generate these configuration identifiers in any appropriate manner.

To illustrate how this process may be completed in particular embodiments of system 10, FIG. 2 shows an example in which each node 46 of binary tree 44 stores a valuation for multiple different configurations on a particular variable frame. For each configuration, information aggregator 40 may generate a configuration identifier, based on the states included in the configuration. In particular, information aggregator 40 may, for each state in the configuration, multiply the state's respective state identifier by the offset for the associated variable to determine a contribution of the state to the configuration identifier. Information aggregator 40 may then sum the contributions of all the states in the configuration to determine a configuration identifier for that contribution. Because each node 46 may store valuation for multiple configurations, each node 46 may, in particular embodiments, be associated with multiple different configuration identifiers.

For example, in FIG. 2, the example node 46x stores valuations for various configurations over a variable frame of [engine type, engine number, aircraft length]. In particular, example node 46x stores valuations for the configurations [[jet, short, 2 engines], [propeller, medium, 2 engines], [jet, medium, 4 engines], [propeller, long, 8 engines]]. As a result, information aggregator 40 may generate an identifier for each of these configurations based on the variable offsets and state identifiers associated with the components of that configuration. Using the example identifiers shown in table 200, information aggregator 40 calculates a configuration identifier of "6" for the [jet, short, 2 engines] configuration, "9" for the [propeller, medium, 2 engines] configuration, "20" for the [jet, medium, 4 engines] configuration, and "47" for the [propeller, long, 8 engines] configuration.

Information aggregator 40 then stores these configuration identifiers for the various configurations in an ordered list 210 for the original variable frame associated with the example node 46x. In particular embodiments, information aggregator 40 may generate, for each node 46, an ordered listing of configuration identifiers for all the configurations for which the relevant node 46 holds information. Thus, in the illustrated example, information aggregator 40 stores configuration identifiers for the various configurations associated with the example node 46*x* in an ordered list 210 in increasing order—i.e., as (6, 9, 20, 47).

In addition, using similar techniques to those described above, information aggregator 40 may generate configuration identifiers for the various configurations represented in this valuation along each possible subframe of the original variable frame. Information aggregator 40 may then sort and store the configuration identifiers for each subframe in a separate ordered list 210. Thus, in the described example, information aggregator 40 generates configuration identifiers for each of the configurations of example node 46*x* along the various possible subframes of the original variable frame [engine type, length, number of engines]—namely, [engine type, length], [engine type, number of engines], [length, number of engines], [engine type], [length], and [number of engines]. Information aggregator 40 then stores these configuration identifiers in a separate ordered list for each variable subframe (represented in FIG. 2 by the additional ordered lists 210).

For example, for the [engine type, length] subframe, information aggregator 40 uses variable offsets of 1 and 2, respectively, for the "engine type" and "length" variables. Similarly, for the [engine type, number of engines] subframe, information aggregator 40 uses variable offsets of 1 and 2, respectively, for the "engine type" and "number of engines" variables. For the [length, number of engines] subframe, information aggregator 40 uses variable offsets of 1 and 3, respectively, for the "length" and "number of engines" variables. Additionally, for each of the single-variable subframes (i.e., [engine type], [length], and [number of engines]), information aggregator 40 uses a variable offset of 1 for the relevant variable. As a result, when information aggregator 40 generates and sorts configuration identifiers on the various variable subframes in this example, information aggregator 40 produces ordered configuration identifier lists of [0, 2, 3, 5], [2, 3, 6, 15], [3, 4, 10, 23], [0, 0, 1, 1], [0, 1, 1, 2], and [1, 1, 3, 7], respectively, for the subframes [engine type, length], [engine type, number of engines], [length, number of engines], [engine type], [length], and [number of engines] [engine type, length], [engine type, number of engines], [length, number of engines], [engine type], [length], and [number of engines].

Information aggregator 40 may then store an ordered list 210 containing configuration identifiers on the original variable frame, as well as ordered lists 210 containing configuration identifiers on all the variable subframes, in example node 46*x* (e.g., as part of a data object representing that node 46) or otherwise associate these ordered lists with example node 46*x* in database 42. In particular embodiments, the ordered lists 210 for the subframes may contain, for each subframe configuration identifier, a pointer to a corresponding full-frame configuration identifier or database 42 may associate subframe configuration identifiers and their original configurations in some other manner so that information aggregator 40 can subsequently identify the original configuration associated with each subframe configuration identifier. Additionally, in particular embodiments, the full-frame configuration identifiers may be used as a secondary sorting criteria for the subframe configuration identifiers when storing the various sets of subframe configuration identifiers in ordered lists 210.

Once created, ordered lists 210 may be used to facilitate the combination of information from example node 46*x* with information from other nodes 46 and/or evidence 22. By storing the various configuration identifiers associated with a particular node 46 of join tree 44 in ordered lists 210, information aggregator 40 may simplify the task of updating join tree 44 based on evidence 22 or aggregating data in join tree 44 to make determinations. Under Shafer's Rule of Combination, aggregating evidence stored in join tree 44 to determine a belief value for a particular state or updating join tree 44 based on new evidence 22 involves determining the effect of the valuations for which a particular node 46 holds evidence 22 on the valuations stored by every other node 46 in join tree 44. This may involve calculating the intersection of every configuration for which a particular node 46 stores information with every configuration of newly-added evidence 22 and propagating the results through join tree 44. Alternatively, in particular embodiments, information aggregator 40 may be configured to utilize lazy propagation. In such embodiments, instead of immediately propagating changes through join tree 44, information aggregator 40 may invalidate network caches to force propagation if and when affected data in join tree 44 is needed. Regardless of when propagation occurs, storing configuration identifiers in an ordered list 210 simplifies the process of comparing the configurations of example node 46*x* with those of other nodes 46 and determining what elements are shared by the configurations, as illustrated further with respect to FIG. 3.

Figure 3:
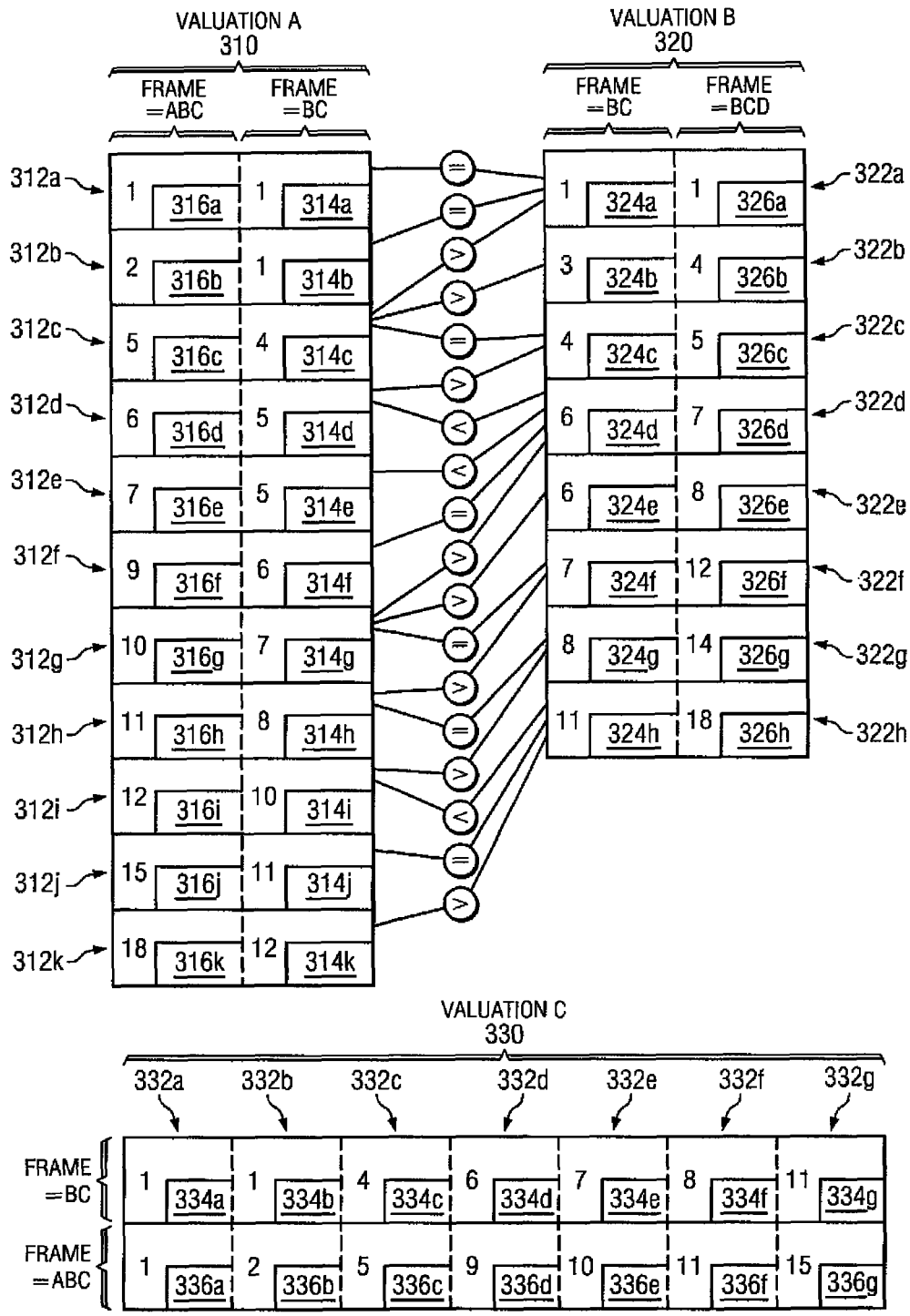
FIG. 3 illustrates an example operation of a particular embodiment of the information aggregator in comparing information identifiers for two valuations.

FIG. 3 illustrates an example of how certain embodiments of information aggregator 40 may compare the configurations associated with two valuations once identifiers have been generated for the configurations and these configuration identifiers have been stored in ordered lists. In the illustrated example, a valuation (referred to here as "Valuation A") on a first variable frame is being combined with a valuation (referred to here as "Valuation B") on a second variable frame. The combination may represent the addition of new evidence 22 to join tree 44 or the aggregation of information from multiple existing nodes 46 of join tree 44. In the illustrated example, Valuation A provides support for a group of configurations on a first variable frame "ABC," while Valuation B provides support for a group of configurations on a different variable frame, "BCD."

To complete the combination, in this example, information aggregator 40 identifies a common subframe based on the intersection of Valuation A's variable frame (ABC) and Valuation B's variable frame (BCD). Information aggregator 40 then accesses or retrieves ordered lists of configuration identifiers for the configurations supported by each valuation. In particular, information aggregator 40 accesses or retrieves, for each valuation, ordered lists of configuration identifiers that were generated on the common subframe. The ordered list for Valuation A on the common subframe is shown in FIG. 3 as list 310, and the ordered list for Valuation B on the common subframe is shown as list 320.

List 310 includes a plurality of entries 312*a-k*, each corresponding to a different configuration supported by Valuation A, while list 320 includes a plurality of entries 322*a-h*, each corresponding to a different configuration supported by Valuation B. Each entry 312 in list 310 includes a subframe configuration identifier 314 that uniquely identifies a particular configuration supported by Valuation A, and each entry 322 in list 320 includes a subframe configuration identifier 324 that uniquely identifies a particular configuration supported by Valuation B. In particular, the subframe configuration identifiers 314 and 324 each identify the variables of the corresponding configuration that are on the common subframe (BC). As shown in FIG. 3, information aggregator 40 has sorted subframe configuration identifiers 314*a-k* in list 310 and stored them (and their corresponding entries 312a-k) in a particular order (here, increasing). Likewise, information aggregator 40 has sorted subframe configuration identifiers 324a-h in list 320 and stored them (and their corresponding entries 322a-h) based on the same order.

As noted above, in particular embodiments, information aggregator 40 may also store information associating subframe configuration identifiers 314 and 324 with information specifying a configuration on the original variable frames of Valuation A and Valuation B associated with each of these subframe configuration identifiers or otherwise associate each subframe configuration identifier 314 and 324 with a configuration on the full variable frame of its respective valuation.

For example, in the illustrated embodiment, information aggregator 40 stores a full-frame configuration identifier 316 for each subframe configuration identifier 314 in list 310 as a separate field or portion of the corresponding entry 312. Likewise, information aggregator 40 stores a full-frame configuration identifier 326 for each subframe configuration identifier 324 in list 320. Full-frame configuration identifiers 316 identify a configuration of variables on the full variable frame of Valuation A (ABC) associated with the relevant entry 312, while full-frame configuration identifiers 326 identify a configuration of variables on the full variable frame of Valuation B (BCD) associated with the relevant entry 322. Additionally, in this example, information aggregator 40 uses the full-frame configuration identifiers 316 and 326 as secondary criteria for sorting subframe configuration identifiers 314 and 324 and their corresponding entries 312 and 322.

To facilitate the combination of Valuation A and Valuation B, in this example, information aggregator 40 selects the frame of one of the valuations (here, the variable frame of Valuation A, or "ABC") as the target frame on to which the combined valuations will be projected. As a result, when information aggregator 40 determines that an entry 312 from list 310 and an entry 322 from list 320 having matching subframe configuration identifiers 314 and 324, information aggregator 40 will store the entry 312 from list 310 in a result list 330 associated with a result valuation (referred to here as "Valuation C"), as described further below.

Information aggregator 40 then compares the subframe configuration identifier 314a corresponding to a first entry 312a in list 310 with the subframe configuration identifier 324a corresponding to the first configuration 322a in list 320. If information aggregator 40 determines that subframe configuration identifier 314a in list 310 is greater than subframe configuration identifier 324a in list 320, information aggregator 40 advances to entry 312b in list 310 and repeats the comparison, comparing identifier 314b to identifier 324a. If, instead, information aggregator 40 determines that identifier 314a is less than identifier 324a, information aggregator 40 advances to entry 322b in list 320, and repeats the comparison, comparing subframe configuration identifier 314a to subframe configuration identifier 324b. Additionally, if information aggregator 40 determines that subframe configuration identifier 314a is equal to subframe configuration identifier 324a, information aggregator 40 copies entry 312a to result list 330. Information aggregator 40 then advances to entry 312b in list 310, and repeats the comparison, comparing subframe configuration identifier 314b to subframe information identifier 324a. List 310 and 320 may each have multiple entries that contain the same subframe configuration identifiers 314 and 324 for different full frame configurations, so information aggregator 40 advances to the next entry 312 of list 310 and compares that entry to the current entry 322 of list 320 without yet advancing to the next entry 322 of list 320.

Information aggregator 40 repeats this process until information aggregator 40 has compared all of the subframe configuration identifiers 314 in list 310 to at least one subframe configuration identifier 324 in list 320. Once information aggregator 40 has compared all of the subframe configuration identifiers 314 in list 310 to at least one subframe configuration identifier 324 in 320, information aggregator 40 may then terminate the comparison. After information aggregator 40 has completed the comparison, the contents of result list 330 will reflect the intersection, over the joint subframe, of the configurations of Valuation A and those of Valuation B. For example, after the comparison is complete in the illustrated example, result list 330 includes a set of entries 332a-g that are each associated with one of the configurations in this intersection. In particular, each entry 332 of result list 330 include a subframe configuration identifier 334 for one of the configurations in this intersection and a corresponding full-frame configuration identifier 336 (here, over the variable frame of Valuation A) for the same configuration.

Because lists 310 and 320 are ordered on the joint subframe, the number of comparisons that information aggregator 40 must make to identify matching subframe comparisons may be significantly reduced in particular embodiments. After performing these comparisons, information aggregator 40 completes the combination in accordance with the Dempster-Shafer Rule of Combination. By using the variable frame of one of the valuations to be combined as the variable frame for the resulting valuation, Valuation C, and by utilizing the ordered subframe configuration identifiers 314 and 324 to identify common configurations shared by the two valuations, particular embodiments of information aggregator 40 can significantly reduce the time, processing, and/or memory requirements for combining valuations.

Figure 4:
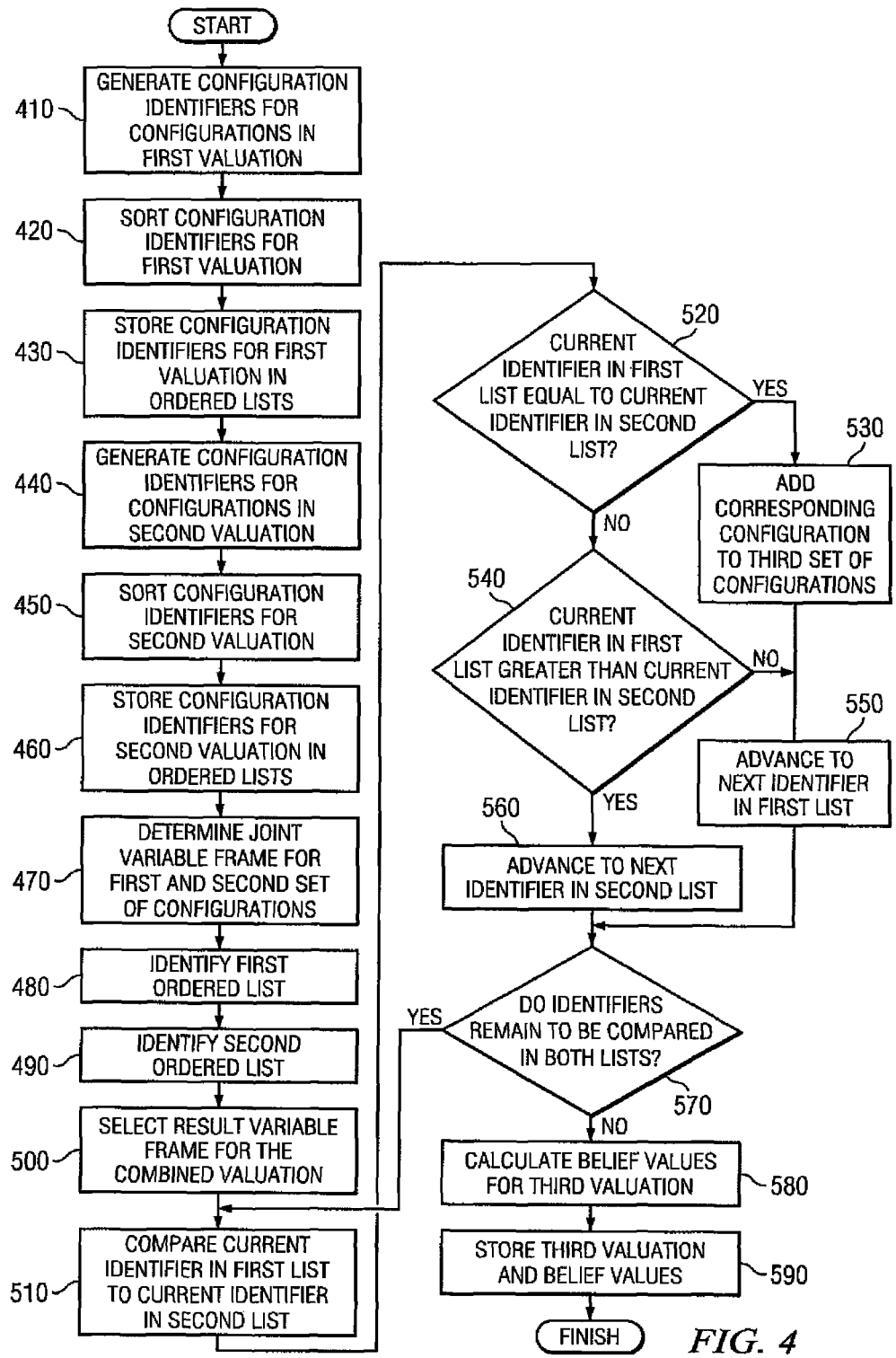
FIG. 4 is a flow chart detailing an example operation of a particular embodiment of the information aggregator in aggregating information.

FIG. 4 is a flowchart illustrating an example operation of a particular embodiment of information aggregator 40 in combining two valuations stored in join tree 44. Information aggregator 40 may combine nodes 46 in response to receiving new evidence 22 from sensors 20 or at other appropriate times to determine joint valuations for one or more variables monitored by information aggregator 40. In this example, information aggregator 40 combines a first valuation (Valuation A) associated with a first variable frame and a second valuation (Valuation B) associated with a second variable frame. The first valuation indicates a level of support for a first set of configurations, while the second valuation indicates a level of support for a second set of configurations.

Operation begins at step 410 with information aggregator 40 generating a first set of configuration identifiers for Valuation A. Information aggregator 40 may generate this first set of configuration identifiers when Valuation A is first stored by information aggregator 40, when information aggregator 40 attempts to combine Valuation A with other valuations in join tree 44, or at any other appropriate time during its operation. In particular embodiments, this first set of configuration identifiers includes a full-frame configuration identifier corresponding to each of the configurations in Valuation A. This first set of configuration identifiers also includes, for each subframe of Valuation A's variable frame, a group of subframe configuration identifiers for each configuration supported by Valuation A.

As discussed above, information aggregator 40 may generate this first set of identifiers in any appropriate manner. In particular embodiments, information aggregator 40 assigns a variable offset to each variable on the relevant variable frame or subframe and a state identifier to each state possible for the variables on this frame or subframe. Then, for each configuration supported by Valuation A, information aggregator 40 multiplies the variable offset for each variable in the configuration by the state identifier for the state that variable has in the configuration. Information aggregator 40 then sums these products to obtain the configuration identifier for that configuration on the relevant frame or subframe. After generating configuration identifiers for every configuration in the first valuation, information aggregator 40 sorts configuration identifiers, at step 420, and stores them in ordered lists at step 430. In particular, information aggregator 40 sorts the full-frame configuration identifiers and stores the sorted full-frame configuration identifiers in a first ordered list. Information aggregator 40 also sorts the subframe configuration identifiers for each subframe of Valuation A and stores the sorted subframe configuration identifiers for each subframe in separate ordered lists.

Information aggregator 40 repeats this process for Valuation B. Thus, at step 440, information aggregator 40 generates a second set of configuration identifiers for Valuation B. Information aggregator 40 may generate this second set of configuration identifiers when Valuation B is first stored by information aggregator 40, when information aggregator 40 attempts to combine Valuation B with other valuations in join tree 44 (such as Valuation A), or at any other appropriate time during its operation. In particular embodiments, this second set of configuration identifiers includes a full-frame configuration identifier corresponding to each of the configurations in Valuation B. This second set of configuration identifiers also includes, for each subframe of Valuation B's variable frame, a subframe configuration identifier for each configuration in Valuation B. Information aggregator 40 generates this second set of identifiers in a similar manner to the first set of configuration identifiers.

After generating configuration identifiers for the configurations in Valuation B, information aggregator 40 sorts these configuration identifiers, at step 450, and stores them in ordered lists at step 460. As with the first set of configuration identifiers, information aggregator 40 sorts the full-frame configuration identifiers for Valuation B and stores the sorted full-frame configuration identifiers in a first ordered list. Information aggregator 40 also sorts the subframe configuration identifiers for each subframe of Valuation B and stores the sorted subframe configuration identifiers for each subframe in separate ordered lists.

At step 470, information aggregator 40 determines a joint variable frame for the combination of Valuation A and Valuation B. In particular embodiments, information aggregator 40 determines the joint variable frame by calculating the intersection of Valuation A's full variable frame and Valuation B's full variable frame. At step 480, information aggregator 40 identifies a first ordered list that is associated with Valuation A and contains subframe configuration identifiers (or full-frame configuration identifiers if Valuation A and Valuation B are on the same variable frame) corresponding to the joint variable frame. At step 490, information aggregator 40 identifies a second ordered list that is associated with Valuation B and also contains subframe (or full-frame) configuration identifiers corresponding to the joint variable frame. In particular embodiments, information aggregator 40 may also select a resulting variable frame for the combined valuation at step 500. In particular embodiments, information aggregator 40 selects the full variable frame of one of the valuations to be combined, such as the variable frame of the Valuation A, and copies that variable frame to another memory location for use as the variable frame of the valuation resulting from the combination (Valuation C).

Information aggregator 40 then compares the first ordered list to the second ordered list and identifies, based on this comparison, a third set of configurations identifiers. This third set of configuration identifiers identify configurations that are supported by both Valuation A and Valuation B on the joint variable frame. Information aggregator 40 may perform this comparison in any appropriate manner.

One particular example of how the comparison may be implemented is shown in steps 510-570 of FIG. 4. More specifically, starting with the first identifier in each ordered list, information aggregator 40 compares a configuration identifier in the first ordered list to a configuration identifier in the second ordered list, at step 510. If information aggregator 40 determines, at step 520, that the current identifier in the first list is equal to the current identifier in the second ordered list, information aggregator 40 adds the configuration associated with the current configuration identifiers to a third set of configurations, a set for the resulting Valuation C, at step 530 and operation continues at step 550. If information aggregator 40 determines the configuration identifiers are not equal, operation continues at step 540.

At step 540, information aggregator 40 determines whether the current configuration identifier in the first ordered list is greater than the current configuration identifier in the second ordered list. If not, at step 550, information aggregator 40 advances to the next configuration identifier in the first ordered list. If the current configuration identifier in the first ordered list is greater than the current configuration identifier in the second ordered list, however, information aggregator 40 advances to the next configuration identifier in the second ordered list at step 560.

At step 570, information aggregator 40 determines whether identifiers remain to be compared in both the first ordered list and the second ordered list. If both of the ordered lists still include configuration identifiers that have not yet been compared to the other ordered list, operation returns to step 510. If one of the ordered lists has no more remaining uncompared identifiers, then operation continues to step 580. At step 580, information aggregator 40 calculates a belief value for Valuation C equal to the product of the belief values for Valuation A and Valuation B. If Valuation C is created from multiple intersections between Valuation A and Valuation B, information aggregator 40 sums the various products for these intersections to arrive at a belief value for the resulting Valuation C. Information aggregator 40 then stores Valuation C, which now includes the third set of configurations, and its corresponding belief value in join tree 44 at step 590. Operation of information aggregator 40 with respect to combining the first valuation and the second valuation may then end as shown in FIG. 4.

Figure 5:
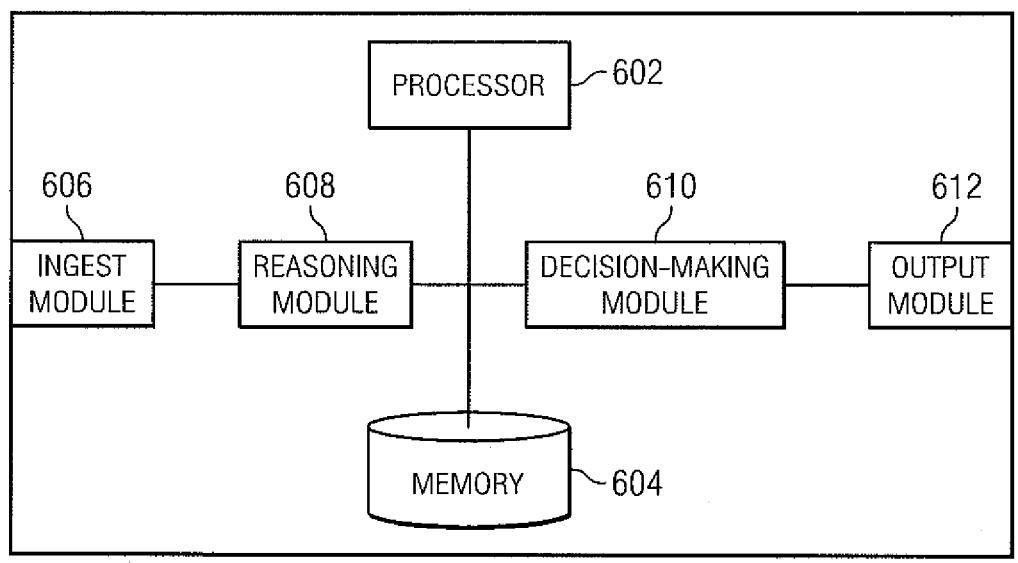
FIG. 5 is a block diagram illustrating in more detail the contents of a particular embodiment of the information aggregator.

FIG. 5 is a block diagram illustrating in greater detail the contents of a particular embodiment of information aggregator 40. The illustrated embodiment of FIG. 5 includes a processor 602, memory 604, an ingest module 606, a reasoning module 608, a decision-making module 610, and an output module 612. Alternative embodiment of information aggregator 40 may include any appropriate combination of hardware and/or software suitable to provide the described functionality.

Processor 602 may represent or include any form of processing component, including general purpose computers, dedicated microprocessors, or other processing devices capable of processing electronic information. Examples of processor 602 include digital signal processors (DSPs), application-specific integrated circuits (ASICs), field-programmable gate arrays (FPGAs), and any other suitable specific- or general-purpose processors. Although FIG. 5 illustrates a particular embodiment of information aggregator 40 that includes a single processor 602, information aggregator 40 may include any suitable number of processors 602.

Memory 604 stores processor instructions, database 42, received evidence 22, and/or other information or values that information aggregator 40 utilizes during operation. In particular embodiments, memory 604 may also store determinations made by information aggregator 40 for subsequent analysis. Memory 604 may comprise any collection and arrangement of volatile or non-volatile components suitable for storing data. For example, memory 604 may comprise random access memory (RAM) devices, read-only memory (ROM) devices, magnetic storage devices, optical storage devices, or any other suitable data storage devices. In particular embodiments, memory 604 may represent, in part, computer-readable storage media on which computer instructions and/or logic are encoded. In such embodiments, some or all the described functionality of information aggregator 40 may be provided by processor 602 executing the instructions encoded on the described media. Although shown in FIG. 5 as a single component, memory 604 may represent any number of memory elements within, local to, or accessible by information aggregator 40. Additionally, although shown in FIG. 5 as being located internal to information aggregator 40, memory 604 may represent storage components remote from information aggregator 40.

Ingest module 606 receives evidence 22 from sensors 20 and prepares evidence 22 or information extracted from evidence 22 for entry into database 42. In particular embodiments, ingest module 606 may generate valuations involving the variables monitored by sensors 20 based on evidence 22. In alternative embodiments, sensors 20 may provide valuations for the relevant variable s as part of evidence 22. Ingest module 606 may perform any other appropriate processing to prepare evidence 22 for entry into database 42 including, but not limited to, formatting, normalizing, filtering, and verifying evidence 22.

Reasoning module 608 inserts information output by ingest module 606 into database 42. In particular embodiments, reasoning module 608 is configured to utilize Dempster-Shafer reasoning algorithms to insert information into a binary join tree. As a result, in particular embodiments, reasoning module 408 is responsible for applying Dempster's Rule of Combination for purposes of inserting new information into join tree 44 and propagating the new information through the nodes 46 of join tree 44. Additionally, in such embodiments, reasoning module 608 generates configuration identifiers for valuations generated by ingest module 606 and stores these configuration identifiers in ordered lists to facilitate the combination operation. Reasoning module 608 may also combine valuations associated with various nodes of a join tree 44 in database 42 to facilitate decisions based on evidence 22.

Decision-making module 610 makes decisions regarding objects of interest 30 based on information stored in database 42. In particular embodiments, decision-making module 610 may make such decisions in response to determining that a belief value associated with a particular valuation or valuations in join tree 44 exceeds a particular threshold level. Decision-making module 610 may utilize the information in database 42 to make any appropriate determinations. For example, in particular embodiments, information aggregator 40 may represent part of a combat identification system, and decision-making module 610 may determine nationalities of object of interests 30 based on information in database 42.

Output module 612 outputs decisions made by decision-making module 610 to a user of information aggregator 40 and/or other components of system 10. As a result, output module 612 may generate output signals based on decisions made by decision-making module 610 suitable for use by input/output (I/O) components of information aggregator 40 or by other components of system 10. For example, in particular embodiments, information aggregator 40 couples to or includes components capable of providing sensory feedback to an operator of system 10 based on decisions made by decision-making module 610 including, but not limited to, a computer monitor, a liquid crystal display (LCD), a light-emitting diode (LED) display, one or more indicator lights, or an audio alarm. Output module 612 may generate appropriate output signals for such I/O components to permit information aggregator 40 to indicate a decision, such a nationality-determination, made by information aggregator 40 to the operator. Additionally, output module 612 may generate data for storage in memory 604 based on decision made by decision-making module 610.

In general, each of ingest module 606, reasoning module 608, decision-making module 610, and output module 612 may represent any appropriate combination of hardware and/or software suitable to provide the described functionality. Additionally, any two or more of ingest module 606, reasoning module 608, decision-making module 610, and output module 612 may represent or include common elements. In particular embodiments, ingest module 606, reasoning module 608, decision-making module 610, and output module 612 represent, in part, software applications being executed by processor 602.

Although the description focuses on a particular example in which sensors 20 generate evidence 22 relating to certain variables and system 10 utilizes the generated evidence 22 to make a particular type of determination, alternative embodiments of system 10 may include sensors 20 capable of generating evidence 22 relating to any appropriate variables and may use this evidence 22 to make any appropriate determination relating to or associated with the monitored object of interest 30. Likewise, although the description focuses on embodiments in which Dempster-Shafer reasoning is used to aggregate evidence 22, alternative embodiments may utilize other evidential reasoning techniques for decision-making. Although the present invention has been described in detail, it should be understood that various changes, substitutions and alterations can be made hereto without departing from the sphere and scope of the invention as defined by the appended claims.

What is claimed is:

1. A method for aggregating information, comprising:
   receiving information defining a first valuation, wherein the first valuation indicates a level of support for each of a first set of configurations;
   generating a configuration identifier for each of the first set of configurations;
   storing the configuration identifiers for the first set of configurations in a first ordered list;
   receiving information defining a second valuation, wherein the second valuation indicates a level of support for each of a second set of configurations;
   generating a configuration identifier for each of the second set of configurations;
   storing the configuration identifiers for the second set of configurations in a second ordered list;
   comparing the first ordered list to the second ordered list;
   identifying, based on the comparison of the first ordered list and the second ordered list, a third set of configurations that are included in both the first set of configurations and the second configurations;

generating a third valuation based on the third set of configurations, wherein the third valuation indicates a level of support for each of the third set of configurations;
storing at least a portion of the third valuation in an electronic memory;
selecting a target variable frame from among a first variable frame associated with the first valuation and a second variable frame associated with the second valuation;
determining a joint variable frame based on an intersection of the first variable frame and the second variable frame, and wherein:
generating a configuration identifier for each of the first set of configurations comprises generating a configuration identifier for each of the first set of configurations based on the joint variable frame;
generating a configuration identifier for each of the second set of configurations comprises generating a configuration identifier for each of the second set of configurations based on the joint variable frame; and
generating the third valuation comprises generating the third valuation over the target variable frame.

2. The method of claim 1, wherein the first set of configurations and the second set of configurations include variables that are associated with an object of interest, and further comprising determining a characteristic of the object of interest based on the third valuation.

3. The method of claim 2, further comprising indicating the determined characteristic to a user.

4. The method of claim 2, wherein one of the first set of configurations and the second set of configurations include a variable associated with a number of engines the object of interest has.

5. The method of claim 2, wherein one of the first set of configurations and the second set of configurations include a variable associated with an engine type 30 of the object of interest.

6. The method of claim 2, wherein one of the first set of configurations and the second set of configurations include a variable associated with a size of the object of interest.

7. The method of claim 2, wherein the object of interest comprises a potential target for a weapon system, and determining a characteristic of the object comprises determining a nationality associated with the target.

8. The method of claim 1, wherein storing at least a portion of the third valuation comprises storing at least a portion of the third valuation in a binary join tree.

9. An intelligence-gathering system, comprising:
a plurality of sensors, each sensor operable to generate evidence regarding an object of interest and transmit the evidence to an information aggregator; and
the information aggregator operable to:
generate a first valuation based on evidence received from the plurality of sensors, wherein the first valuation indicates a level of support for each of a first set of configurations;
generate a configuration identifier for each of the first set of configurations;
store the configuration identifiers for the first set of configurations in a first ordered list;
generate a second valuation based on evidence received from the plurality of sensors, wherein the second valuation indicates a level of support for each of a second set of configurations;
generate a configuration identifier for each of the second set of configurations;
store the configuration identifiers for the second set of configurations in a second ordered list;
compare the first ordered list to the second ordered list;
identify, based on the comparison of the first ordered list and the second ordered list, a third set of configurations that are included in both the first set of configurations and the second configurations;
generate a third valuation based on the third set of configurations, wherein the third valuation indicates a level of support for each of the third set of configurations;
store at least a portion of the third valuation in an electronic memory;
select a target variable frame from among a first variable frame associated with the first valuation and a second variable frame associated with the second valuation;
determine a joint variable frame based on an intersection of the first variable frame and the second variable frame, and wherein the information aggregator is operable to
generate a configuration identifier for each of the first set of configurations by generating a configuration identifier for each of the first set of configurations based on the joint variable frame;
generate a configuration identifier for each of the second set of configurations by generating a configuration identifier for each of the second set of configurations based on the joint variable frame; and
generating the third valuation by generating the third valuation over the target variable frame.

10. The system of claim 9, wherein:
the first set of configurations and the second set of configurations include variables that are associated with an object of interest, and
the information aggregator is further operable to determine a characteristic of the object of interest based on the third valuation.

11. The system of claim 10, wherein the information aggregator is further operable to indicate the determined characteristic to a user.

12. The system of claim 10, wherein one of the first set of configurations and the second set of configurations include a variable associated with a number of engines the object of interest has.

13. The system of claim 10, wherein one of the first set of configurations and the second set of configurations include a variable associated with an engine type of the object of interest.

14. The system of claim 10, wherein one of the first set of configurations and the second set of configurations include a variable associated with a size of the object of interest.

15. The system of claim 10, wherein:
the object of interest comprises a potential target for a weapon system; and
the information aggregator is further operable to determine a characteristic of the object by determining a nationality associated with the target.

16. The system of claim 9, wherein the information aggregator is further operable to store at least a portion of the third valuation by storing at least a portion of the third valuation in a binary join tree.

17. A computer software product comprising non-transitory computer-readable media encoded with instructions, the instructions operable, when executed, to:
receive information defining a first valuation, wherein the first valuation indicates a level of support for each of a first set of configurations;
generate a configuration identifier for each of the first set of configurations;

store the configuration identifiers for the first set of configurations in a first ordered list;
receive information defining a second valuation, wherein the second valuation indicates a level of support for each of a second set of configurations;
generate a configuration identifier for each of the second set of configurations;
store the configuration identifiers for the second set of configurations in a second ordered list;
compare the first ordered list to the second ordered list;
identify, based on the comparison of the first ordered list and the second ordered list, a third set of configurations that are included in both the first set of configurations and the second configurations;
generate a third valuation based on the third set of configurations, wherein the third valuation indicates a level of support for each of the third set of configurations;
store at least a portion of the third valuation in an electronic memory;
select a target variable frame from among a first variable frame associated with the first valuation and a second variable frame associated with the second valuation;
determine a joint variable frame based on an intersection of the first variable frame and the second variable frame, and wherein:
generate a configuration identifier for each of the first set of configurations by generating a configuration identifier for each of the first set of configurations based on the joint variable frame;
generate a configuration identifier for each of the second set of configurations by generating a configuration identifier for each of the second set of configurations based on the joint variable frame; and
generating the third valuation by generating the third valuation over the target variable frame.

18. A system for aggregating information, comprising:
means for receiving information defining a first valuation, wherein the first valuation indicates a level of support for each of a first set of configurations;
means for generating a configuration identifier for each of the first set of configurations;
means for storing the configuration identifiers for the first set of configurations in a first ordered list;
means for receiving information defining a second valuation, wherein the second valuation indicates a level of support for each of a second set of configurations;
means for generating a configuration identifier for each of the second set of configurations;
means for storing the configuration identifiers for the second set of configurations in a second ordered list;
means for comparing the first ordered list to the second ordered list;
means for identifying, based on the comparison of the first ordered list and the second ordered list, a third set of configurations that are included in both the first set of configurations and the second configurations;
means for generating a third valuation based on the third set of configurations, wherein the third valuation indicates a level of support for each of the third set of configurations;
means for storing at least a portion of the third valuation in an electronic memory;
means for selecting a target variable frame from among a first variable frame associated with the first valuation and a second variable frame associated with the second valuation;
means for determining a joint variable frame based on an intersection of the first variable frame and the second variable frame, and wherein:
means for generating a configuration identifier for each of the first set of configurations comprises generating a configuration identifier for each of the first set of configurations based on the joint variable frame;
means for generating a configuration identifier for each of the second set of configurations comprises generating a configuration identifier for each of the second set of configurations based on the joint variable frame; and
means for generating the third valuation comprises generating the third valuation over the target variable frame.

* * * * *